United States Patent Office.

CONRAD F. MOLL, OF KENTON, OHIO.

Letters Patent No. 105,968, dated August 2, 1870.

IMPROVEMENT IN THE MANUFACTURE OF PURE CARBONATE OF POTASH

The Schedule referred to in these Letters Patent and making part of the same

*To all whom it may concern:*

Be it known that I, CONRAD F. MOLL, of Kenton, in the county of Hardin and State of Ohio, have invented a new and improved Process for Manufacturing Pure Carbonate of Potash; and I do hereby declare that the following is a full, clear, and exact description thereof, which will enable others skilled in the art to make and use the same.

This invention relates to a new and useful improvement in a process for manufacturing the granulated carbonate of potash, (more generally known in commerce as pearlash,) and consists in the mode hereinafter described whereby a pure article of granulated pearlash is produced ready for use, in a much more expeditious manner than it has been heretofore.

The pearlash of commerce is manufactured by leaching the ashes and boiling down the alkali to what is known as black salts. The black salts are then "scortched," or subjected to a high temperature in an oven, after which they are again leached, and then the alkali is boiled down to what is known as "white salts." The "white salts" are then subjected to a very high temperature for four or six hours, when it is removed and cooled, and then packed for market. The article is still so impure that when it goes into the hands of the consumer, (the glass manufacturer,) it has to be again leached before it is ready for use, as the article, as sold in market, contains more or less of what is known to the consumer as "slurry," or sulphate of potash.

My process commences with the "scortchings," obtained as above described, which I take from the oven and dissolve or leach, and allow to settle about one day, (or twenty-four hours,) after which I draw it off into another vessel or tank, and let it remain again to settle for about twenty-four hours. It is then drawn off into a heater and subjected to a boiling temperature for three or four hours, and then the fire is removed, and it is allowed to settle for about twenty-four hours more, when it is drawn off into a cooler, where it is allowed to remain for a day or so.

The alkali is now again drawn off into a kettle or pan, and boiled until it begins to granulate. The fire is now withdrawn; the remaining heat, with constant stirring of the mass completes the process. The pearlash is placed in large boxes and stirred as it cools, when it is packed for market. By repeatedly decanting the alkali, and subjecting it to the action of heat, and allowing it to settle and precipitate all sediment, a pure granulated pearlash is produced, ready for immediate use when purchased by the consumer.

Having thus described my invention,

I claim as new and desire to secure by Letters Patent—

The above-described process for manufacturing granulated carbonate of potash or pearlash, substantially as set forth.

The above specification of my invention signed by me this 9th day of June, 1870.

CONRAD F. MOLL.

Witnesses:
GEO. W. MABEE,
ALEX. F. ROBERTS.